Feb. 8, 1927.

H. W. VALLIN 1,616,721

SUPPORT OR HOLDER FOR SOLDERING IRONS

Filed June 28, 1926

INVENTOR.
H. W. Vallin,
BY John M. Spellman
ATTORNEY.

Patented Feb. 8, 1927.

1,616,721

UNITED STATES PATENT OFFICE.

HANS W. VALLIN, OF DALLAS, TEXAS.

SUPPORT OR HOLDER FOR SOLDERING IRONS.

Application filed June 28, 1926. Serial No. 119,065.

This invention relates to improvements in supports or holders for soldering irons, particularly where repairs are being made in telephone switch-boards at telephone exchanges or on other paraphernalia connected with telephone apparatus. The device, however, is adaptable for use in soldering work generally where a support is required for the soldering iron.

The invention when used in making repairs on telephone switch-boards is peculiarly adaptable to the service required and includes a variety of suspending means for maintaining the holder at different positions and angles according to the point on the switchboard or adjacent parts where the repairs are to made.

One of the particular objects of the invention consists of an arrangement for retarding the transference of heat from the soldering iron held in the device to the legs thereof, in such a manner that the heat is reduced to such an extent that the object on which the legs might rest at any position of the holder is not injured.

The invention also includes as a particular feature, means for preventing the soldering iron from being dislodged therefrom while the holder occupies a position other than horizontal.

With the above and other important objects in view, the invention will be clearly understood from a perusal of the following detailed description, taken in connection with the accompanying drawings and wherein.

Having a more detailed reference to the drawings wherein various numerals are employed to indicate the various parts, the two ends of the device include circular metallic bands 1, one end of the bands being directed outwardly from the circle and formed into a hook 2.

Figure 1:
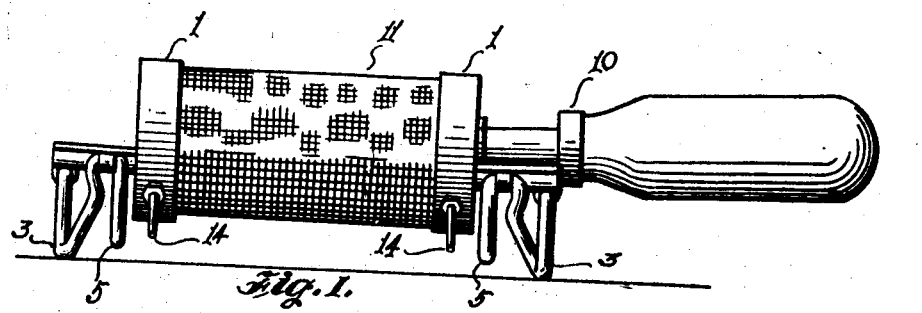
Fig. 1 is a side elevational view of the invention, the holder being shown in a horizontal position, and illustrating a soldering iron therein.
Figure 2:
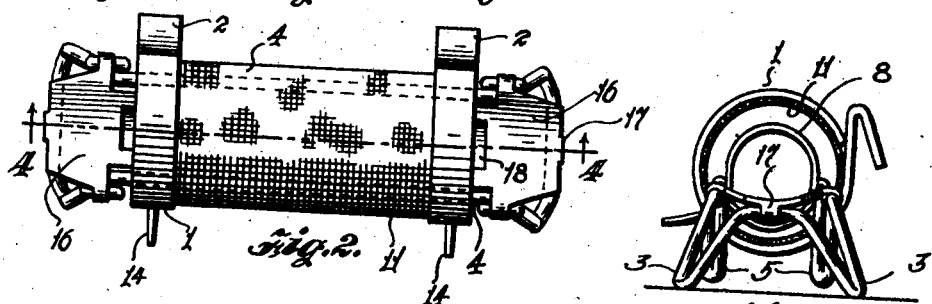
Fig. 2 is a top or plan view.
Figure 3:
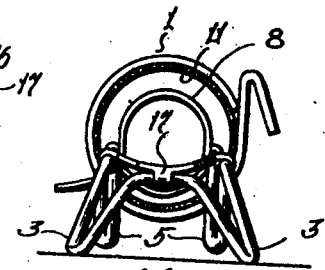
Fig. 3 is an end view.

The bands 1 provide a means of connection for a rod which is passed through the bands and extended outwardly and downwardly into the legs or supporting elements 3. This rod may, as in the present instance, be of one piece and is spaced apart along the inner sides of the bands at the points 4. The parts of the rod forming the legs is first bent downward forming two loops 5 at each end of the device—clearly shown in Figs. 3 and 5. The rod is then directed outward into the legs 3, the two ends of the rod being then welded at the point 6. However, this rod may be constructed in several parts, welded or otherwise fastened at such points as are desirable and found economical in construction of the device.

Centrally of the bands is a roll of metal which forms a receptacle into which the soldering iron 10 is placed. This roll of metal is formed of two parts 8 and 9. The portion 8 is arched and spaced in circular relation to the bands 1, while the part 9 is formed into a trough of an angular formation from side to side. Both sides of the portions 8 and 9 are curled over one upon the other on the longitudinal portions of the rods or rod at the points 4. Then there is provided a cage or shield of mesh material 11 for a protection against any object such as wires in a circuit or other objects coming in contact with the interior parts of the holder.

Figures 5, 6:
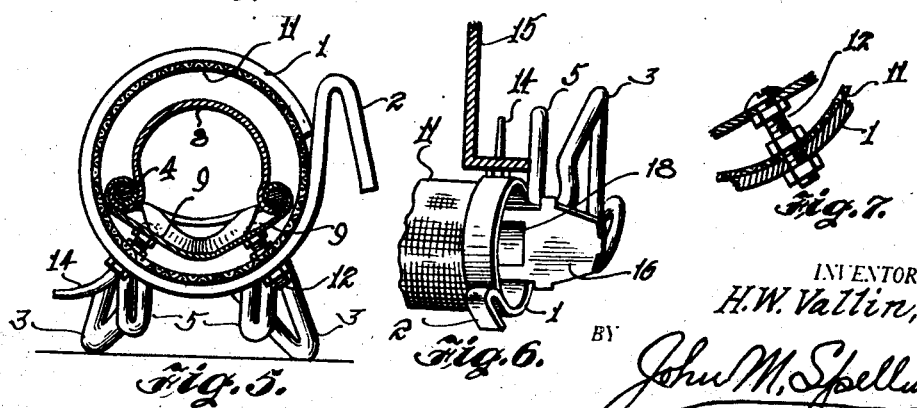
Fig. 5 is a cross-sectional view along line 5—5 of Fig. 4.
Figs. 6 and 7 are detail sectional views, Fig. 6 illustrating in part the manner of suspending the device by one of its supporting elements.
Figure 7:
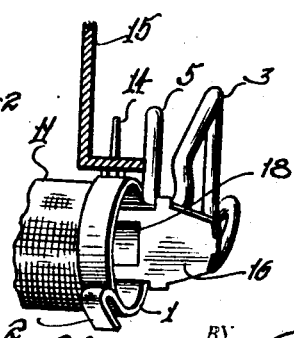

The bands 1, shield 11 and portion 9 of the roll at each end of the device are then connected by bolts 12. Another bolt 13 is provided to fasten the opposite side of these parts 1, 9 and 11. The outer end of one of these bolts is curved outward and tapered at 14 to provide an attaching means for a small hole or crevice anywhere convenient. In Fig. 6 one of these tapered, curved bolts is shown supporting the device from an angle iron 15 forming part of a switchboard frame. In this case the holder will occupy a downward vertical position with the soldering iron in the roll or pocket.

A further advantage of the holder includes an apron 16, one at each end opposite the bands. This apron is widened on its outer ends, and is connected to the rod between the looped portions 5 and the legs 3, also at a point between the spaced legs at 17. This apron is of semicircular formation and is extended into the roll or pocket in a slanting or sloping position. The inner end is somewhat tapered or reduced and also slightly curved to receive the soldering iron 10. The inner tapered or reduced end of the apron has a downwardly struck lip 18 which forms a projection against which the outer edge 10ª of the iron is held.

Figure 4:
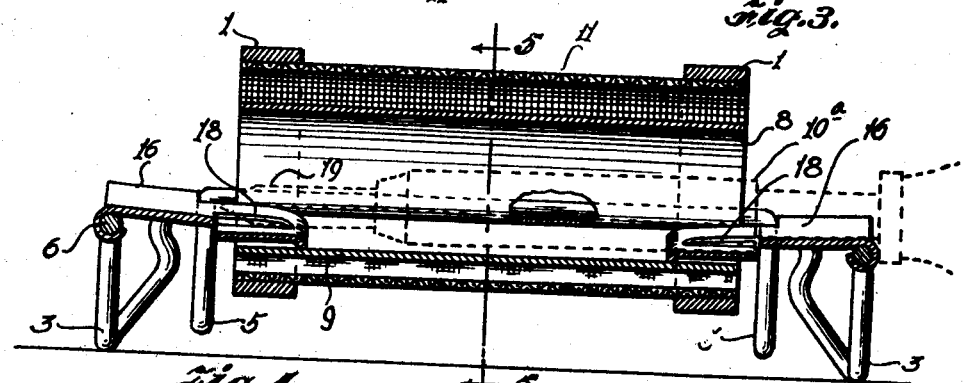
Fig. 4 is a longitudinal sectional view on an enlarged scale, taken on line 4—4 of Fig. 2.

When in position in the holder, the soldering iron occupies a position as shown in the dotted lines in Fig. 4, with the "hot" end 19 of the iron seated in the opposite tapered end of the apron.

From the foregoing it will now be apparent that the holder provides a convenient means for supporting the soldering iron in various positions. For instance, the legs may be inserted between projecting parts of a telephone exchange board frame, the curved and tapered bolts 14 employed to suspend the holder, likewise the hooks 2 provide a ready means of suspension.

The soldering iron cannot be easily dislodged, owing to the lip 18.

It should be understood that alterations may be made in the invention as it is not to be understood as being limited to the specific form shown. Such changes to come within the scope and meaning of the appended claims.

I claim—

1. A soldering iron holder comprising metallic bands constituting end members, a rod connecting the end members in spaced relation, the rod extended downward and forming legs for supporting the holder, an inner hollow core for receiving the soldering iron, and a cage surrounding the core.

2. A soldering iron holder as set out in claim 1, said rod connected to the bands to hold the bands in rigid spaced relation, and said rod projecting beyond the bands and formed into looped portions and including legs formed on the rod spaced apart from the looped portions.

3. A soldering iron holder as set out in claim 1, said bands having hooks formed thereon for attaching the holder to a support.

4. A device for supporting soldering irons comprising an inner receptacle for the iron, legs for supporting the receptacle, an apron adjacent each end of the receptacle and projecting into the inner portion thereof, a lip on said apron to retain a soldering iron in position when the device is out of a horizontal position, and means on both sides of the device for attaching it to a support.

In testimony whereof I affix my signature.

HANS W. VALLIN.